United States Patent
Wang et al.

(10) Patent No.: US 7,835,239 B2
(45) Date of Patent: Nov. 16, 2010

(54) METHOD FOR READING/WRITING DATA FOR A DISK DRIVE

(75) Inventors: Wen-Hong Wang, Hsinchu (TW); Cheng-Ho Tien, Hsinchu (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 197 days.

(21) Appl. No.: 12/357,559

(22) Filed: Jan. 22, 2009

(65) Prior Publication Data
US 2010/0083294 A1 Apr. 1, 2010

(30) Foreign Application Priority Data
Sep. 27, 2008 (CN) .......................... 2008 1 0168924

(51) Int. Cl.
*G11B 7/00* (2006.01)
(52) U.S. Cl. .................................. 369/47.39; 369/44.28
(58) Field of Classification Search .............. 369/47.39, 369/44.22
See application file for complete search history.

(56) References Cited
U.S. PATENT DOCUMENTS 5,442,604 A * 8/1995 Osada ...................... 369/44.11
5,710,497 A * 1/1998 Yanagimachi ............... 318/632
6,459,668 B1 * 10/2002 Satou et al. .............. 369/47.39

* cited by examiner

*Primary Examiner*—Wayne R Young
*Assistant Examiner*—Linh T Nguyen
(74) *Attorney, Agent, or Firm*—Thomas, Kayden, Horstemeyer & Risley, LLP

(57) ABSTRACT

A method for reading/writing data of a disk drive that includes a spindle motor for rotating a disk and a head for reading/writing data from and to the disk. The method includes the steps of; (i) adjusting a position of the head for the first time to space apart the head from a center of the disk at a specific distance, wherein when the head is spaced apart from the center of the disk at the specific distance, the disk vibrates at the minimum magnitude during raising operation of the spindle motor from a low speed to a high speed; (ii) raising the spindle motor from the low speed to the high speed; and (iii) adjusting a position of the head for the second time to move the head to a desired track in the disk for reading/writing data in the desired track.

14 Claims, 3 Drawing Sheets

METHOD FOR READING/WRITING DATA FOR A DISK DRIVE

BACKGROUND OF THE INVENTION

1. Field of the Invention

The invention relates to a method for reading/writing data of a disk drive, and more particularly to a method for effectively lowering the vibration of interior components of the disk drive during raising the rotating speed of a spindle motor from a low speed to a high speed.

2. Description of the Prior Art

The further advance of electronic technology has produced several peripheral devices, such as hard disk, disk drive, image scanner and printing machine having multi functions. As for the disk drive, the optical disk available in the market generally has several GB for storing data, and is capable for preserving the data in video and audio format for a long time. Thus, the optical disk becomes an indispensable storage medium for those, who wish to preserve data for a considerable long time. The DVD (Digital Versatile Disk) of the new generation even contain several tens of GB, is much welcome by the persons in the media world.

FIG. 1 show a conventional disk drive to include a traverse module 1 having a spindle motor 10, a disk loader 11 mounted on the spindle motor 10 for holding a disk (not shown) and rotated by the spindle motor 10, a head 12 mounted on a slide seat 13, a sled motor 14 for driving the slide seat 13 being slid and reciprocally along a guide rod 15 for the head 12 moving horizontally along the disk plane. Thus when the disk is mounted on the disk loader 11, the sled motor 14 adjusts the position of the head 12 relative to the disk so as to focus the laser beam emitted from the head 12 onto a desired track in the disk, thereby reading the data in the desired track during rotation of the spindle motor 10.

Note that, as the storage capacity of the optical disk increases, the disk of new generation should have high rotation speed in order to shorten the reading/writing time for the data. Presently, the rotation speed of the DVD available in the market is raised from 16× speed to 20× speed or above. However, raising the rotation speed in the spindle motor for reading/writing operation causes related problems. For instance, when the disk drive perform read/write operation at high speed, the entire traverse module 1 is subjected under tremendous vibration due to stress of the corresponding mechanism, wobbling of the disk, air circulation within the disk drive and the rotation speed of the spindle motor 10 during raising the spindle motor 10 from a low speed to a high speed. The severe vibration of the traverse module 1 may shorten the service life of the disk drive and the head 12 consequently fails to provide correct reading/writing performance. Under this condition, it becomes an urgent task for the manufacturers to solve the problem how to lower the vibration magnitude of the traverse module 1 during raising the rotation speed of the spindle motor 10 from a lower speed to a higher speed for reading/writing operation.

SUMMARY OF THE INVENTION

It is the object of the present invention to provide a method for reading/writing data, in which, effectively keeping low vibration of the traverse module during raising the rotating speed of the spindle motor from a low speed to a high speed.

In one aspect of the present invention, a method is provided for reading/writing data of a disk drive that includes a spindle motor for rotating an optical disk and a head for reading/writing data from and to the disk. The method accordingly includes the following steps: (i) adjusting a position of the head for the first time in order to space apart the head from a center of the disk at a specific distance, wherein when the head is spaced apart from the center of the disk at the specific distance, an average vibration magnitude of the disk is the minimum during raising the rotating speed of the spindle motor from a low speed to a high speed; (ii) raising the spindle motor from the low speed to the high speed; and (iii) adjusting a position of the head for the second time in order to move the head to a desired track in the disk, thereby starting data reading/writing operation from and to the desired track in the disk.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTIONS OF THE PREFERRED EMBODIMENTS

For a disk drive to perform reading/writing data of a disk at high speed, the position of the reading/writing head will affect the vibration magnitude of the traverse module and the disk when raising the disk from a low speed to a high speed. Therefore, the present invention is to provide a disk reading/writing method that includes the steps to determine the position of the head with respect to the center of the disk so that vibration of the disk can be lower down effectively during raising the disk from a low speed to a high speed.

Figure 1:
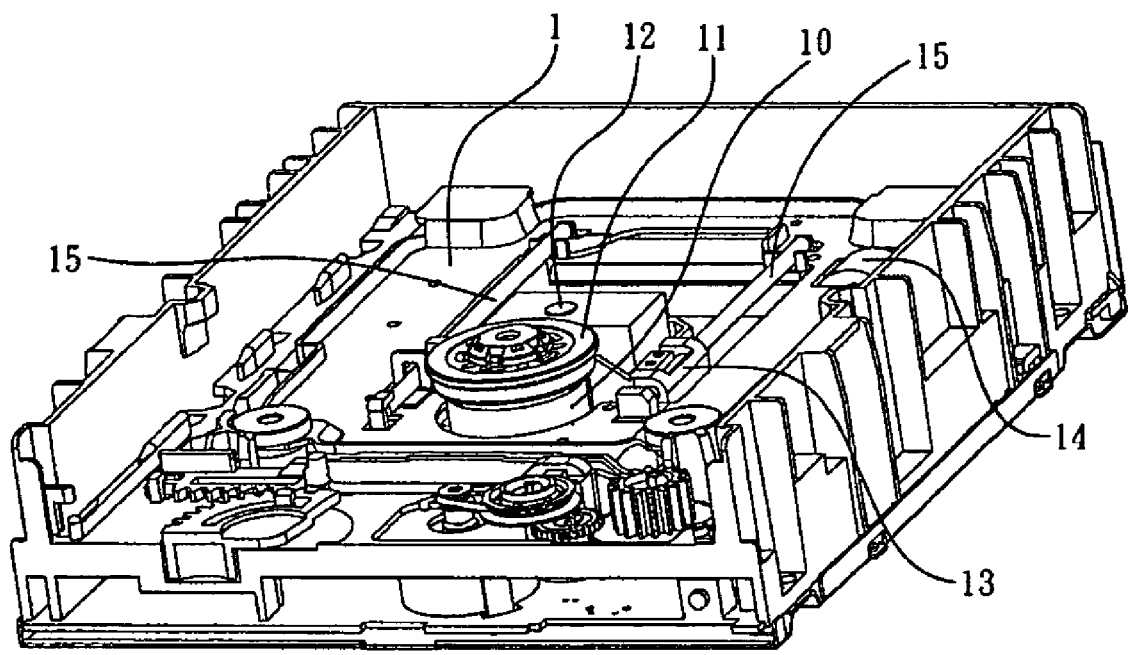
FIG. 1 shows a partly exploded view of a conventional disk drive which includes a traverse module and other interior components.
Figure 2:
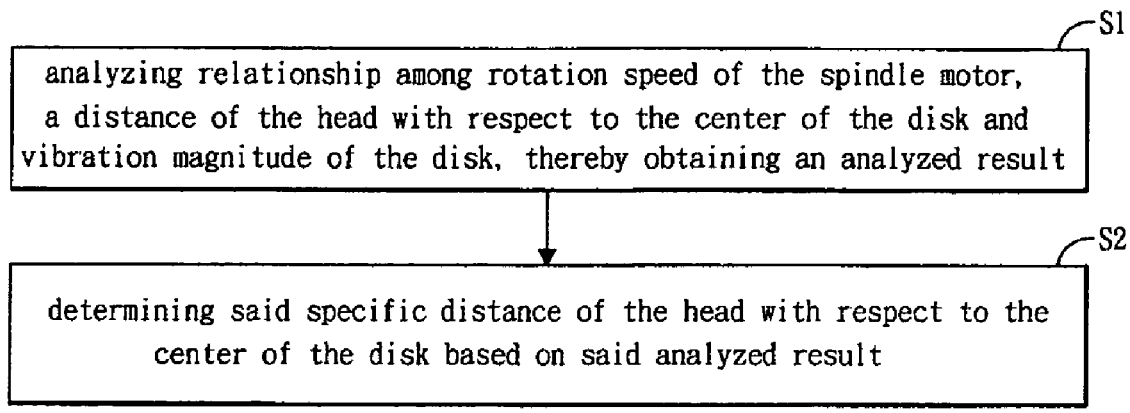
FIG. 2 is a block diagram illustrating the steps according to the present invention to determine a position of a reading/writing head with respect to the center of the disk for reading/writing data in the disk during raising the spindle motor from a low speed to a high speed.

FIG. 2 is a block diagram illustrating the steps according to the present invention to determine the position of a reading/writing head with respect to the center of the disk for reading/writing data in the disk during raising the spindle motor from a low speed to a high speed. The disk drive used in the present invention includes a spindle motor 10 (see FIG. 1) for rotating an optical disk and a head 12 (see FIG. 1) for reading/writing data from and to the disk. The method includes the following steps.

Figure 3:
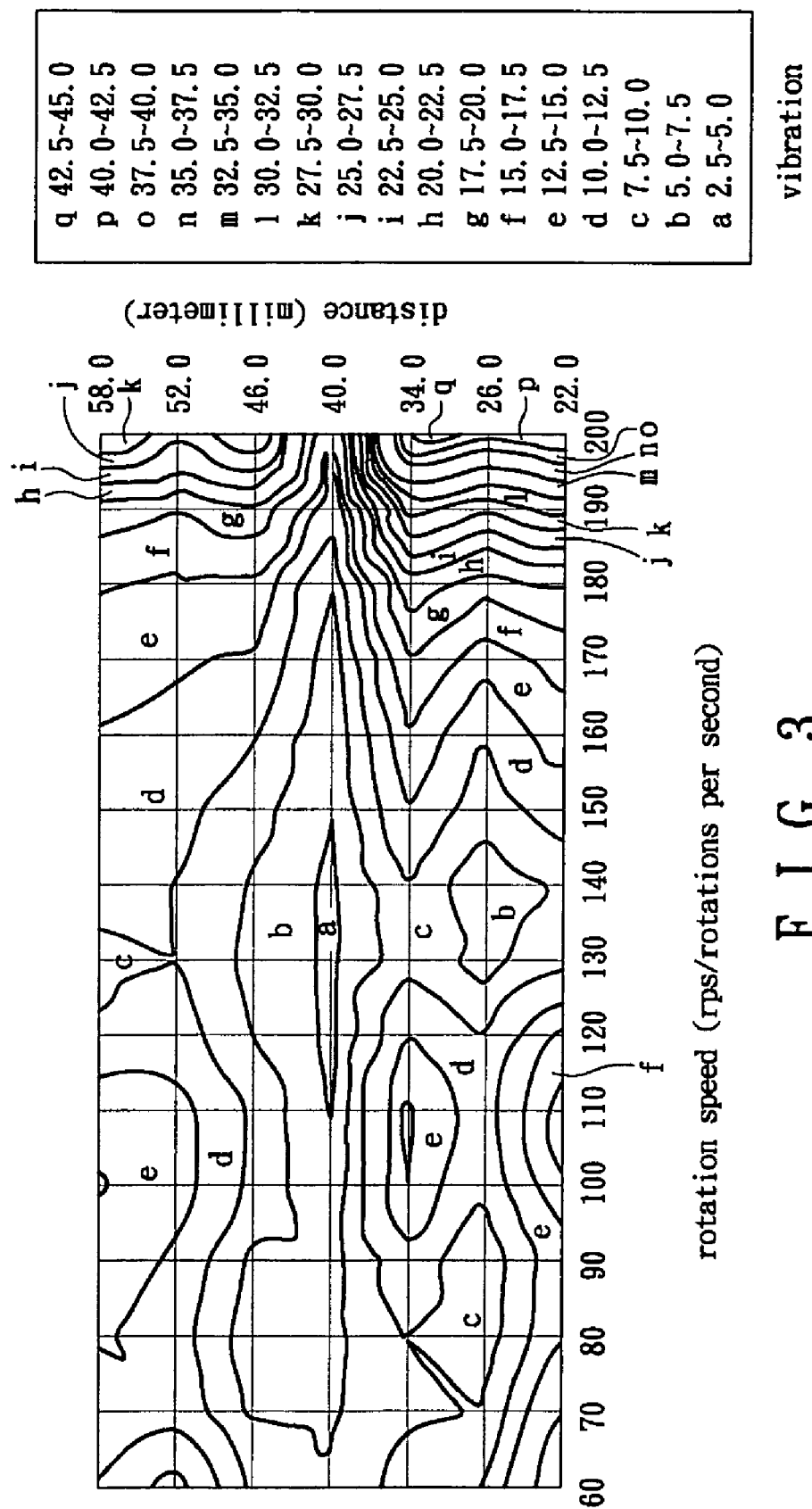
FIG. 3 is a graph representing an analyzed result among rotation speed of the spindle motor, a distance of the head with respect to the center of the disk and vibration magnitude of the disk in a disk drive according to the present invention.

According to step S1, relationship among rotation speed of the spindle motor 10, a distance of the head 12 with respect to the center of the disk and vibration magnitude of the disk is analyzed. Thus, an analyzed result is obtained for further application. FIG. 3 is a graph representing the analyzed result among rotation speed of the spindle motor 10, a distance of the head 12 with respect to the center of the disk and vibration magnitude of the disk in the step S1, wherein the horizontal axis represents the rps (rotations per second) of the spindle motor 10 (ranging from 60 rotations per second to 200 rotations per second) while the vertical axis represents the distance of the head 12 with respect to the center of the disk (the distance ranges from 22.0 millimeters to 58.0 millimeters). The graph in FIG. 3 can be divided into several domains a, b, c, . . . q, and each domain representing a certain vibration magnitude of the disk at different rotation speed and different distance. Note that the domain (a) denotes the smallest vibration magnitude ranging from 2.5 to 5.0 units, the domain (b) denotes the vibration magnitude ranging from 5.0 to 7.5 units, . . . and etc., while the domain (p) has the second largest vibration magnitude ranging from 40.0 to 42.5 units and the domain (q) has the largest vibration magnitude ranging from 42.5 to 45.0 units.

After achieving the analyzed result, the step S2 is performed to define the specific distance of the head 12 with respect to the center of the disk based on the analyzed result for disposing the head 12, wherein when the head 12 is spaced apart from the center of the disk at the specific distance, the average vibration magnitude of the disk is the minimum during raising the rotating speed of the spindle motor from the low speed to the high speed. The average vibration magnitude is an average of the vibration magnitude of the spindle motor at different speeds during raising the rotating speed of the spindle motor from the low speed to the high speed, such as from 60 rotations per second to 200 rotations per second. As illustrated in FIG. 3, when the specific distance of the head 12 is 40.0 millimeters, during raising the rotating speed of the spindle motor from 60 rotations per second to 200 rotations per second, the domains a, b and c respectively represent the vibration magnitude from low to high. In other words, the vibration of the disk ranges from 2.5 to 10.0 units. Compared to the average vibration magnitude of other specific distances, it is found that when the specific distance of the head 12 is 40.0 millimeters, the average vibration magnitude of the disk is the minimum.

Note that in the aforesaid method, the high speed of the spindle motor 10 is set to be 200 rotations per second while the low speed is set to be 60 rotations per second. Of course, in order to obtain the different requirement, the high and low speed ranges can be adjusted, such as one can set the lower speed between 50 to 70 rotations per second while the high speed between 180 to 240 rotations per second.

Figure 4:
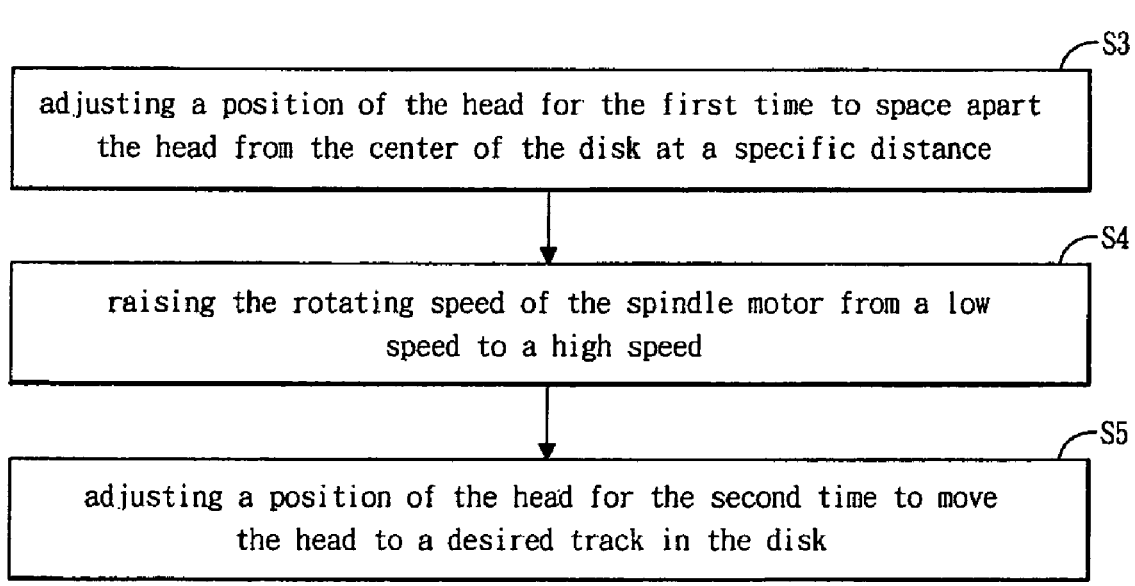
FIG. 4 further illustrates some steps in the method for reading/writing data of a disk drive according to the present invention.

FIG. 4 further illustrates some steps in the method for reading/writing data of a disk drive according to the present invention. The method further includes the following steps.

According to step S3, a position of the head 12 is adjusted for the first time in order to space apart the head 12 from the center of the disk at the specific distance. As illustrated in FIG. 1, when adjusting the specific distance of the head 12, the head 12 is moved by the sled motor 14 to slide along the guide rod 15 in the horizontal direction with respect to the disk.

After disposing the head 12 at the specific distance relative to the center of the disk, the step S4 is performed. The rotating speed of the spindle motor 10 is raised from a low speed to a high speed. At this time, since the head 12 is spaced apart from the center of the disk at the specific distance, an average vibration magnitude of the disk is the minimum during raising the rotating speed of the spindle motor 10 from the low speed to the high speed. As illustrated in FIG. 3, when the specific distance of the head 12 is 40.0 millimeters, the disk vibrates at the minimum vibration magnitude during raising the rotating speed of the spindle motor 10 from 60 rotations per second to 200 rotations per second.

Afterward, the step S5 is performed. It is to adjust a position of the head 12 for the second time in order to move the head 12 to a desired track in the disk, thereby starting data reading/writing operation from and to the desired track in the disk. In other words, the rotation speed of the spindle motor 10 is raised from the lower speed to the high speed so as to perform the reading/writing operation of the disk. As shown in FIG. 1, at this time, the sled motor 14 moves the head 12 along the guide rod 15 for the second time horizontally relative to the disk to enable a laser beam emitted from the head 12 focusing on the desired track in the disk, thereby starting data reading/writing operation from and to the desired track in the disk.

The following advantages are provided by the present method for reading/writing data. As illustrated in FIG. 3, since the disk vibrates at different magnitude due to different positions of the head 12, relationship among rotation speed of the spindle motor 10, a distance of the head 12 with respect to the center of the disk and vibration magnitude of the disk is analyzed. Thus, the head 12 is moved to the position, where it is spaced apart from the center of the disk at the specific distance before raising the speed of the spindle motor 10. Under this condition, the disk vibrates at the minimum during raising the rotating speed of the spindle motor 10 from the low speed to the high speed, which, in turn, causes smaller vibration of the traverse module 1. Hence, the reading/writing ability is increased and consequently prolonging the service life of the disk drive.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for reading/writing data of a disk drive that includes a spindle motor for rotating an optical disk and a head for reading/writing data from and to the disk, comprising the steps:
    adjusting a position of the head for the first time in order to space apart the head from a center of the disk at a specific distance, wherein when the head is spaced apart from the center of the disk at said specific distance, an average vibration magnitude of the disk is the minimum during raising the rotating speed of the spindle motor from a low speed to a high speed;
    raising said spindle motor from said low speed to said high speed; and
    adjusting a position of the head for the second time in order to move the head to a desired track in the disk, thereby starting data reading/writing operation from and to the desired track in the disk.

2. The method according to claim 1, further comprising the following steps prior to adjusting the position of the head for the first time:
    analyzing relationship among rotation speed of the spindle motor, a distance of the head with respect to the center of the disk and vibration magnitude of the disk, thereby obtaining an analyzed result; and
    determining said specific distance of the head with respect to the center of the disk based on said analyzed result, wherein when the head is spaced apart from the center of the disk at said specific distance, the average vibration magnitude of the disk is the minimum during raising the rotating speed of the spindle motor from said low speed to said high speed.

3. The method according to claim 2, wherein said low speed of the spindle motor is 50 to 70 rps (rotations per second).

4. The method according to claim 2, wherein said high speed of the spindle motor is 180 to 240 rps (rotations per second).

5. The method according to claim 1, wherein said specific distance of the head with respect to the center of the disk ranges 22 to 58 mm.

6. The method according to claim 1, wherein said average vibration magnitude is an average of the vibration magnitude of said spindle motor at different speeds during raising the rotating speed of the spindle motor from said low speed to said high speed.

7. The method according to claim 1, wherein the step of adjusting said position of the head for the second time is to move the head horizontally relative to the disk to enable a laser beam emitted from the head focusing on the desired track in the disk, thereby starting data reading/writing operation from and to the desired track in the disk.

8. A method for reading/writing data of a disk drive that includes a spindle motor for rotating an optical disk and a head for reading/writing data from and to the disk, comprising the steps of:

moving the head to have a specific distance from a center of the disk before raising said spindle motor;

raising said spindle motor from a low speed to a high speed; and moving the head to a desired track in the disk, thereby starting data reading/writing operation;

wherein the disk has a minimum average vibration magnitude during the raising step of said spindle motor when the head locates with said specific distance from the center of the disk.

9. The method according to claim 8, wherein said specific distance is determined by a vibration analyzed result of the disk.

10. The method according to claim 8, further comprising the steps of:

analyzing relationship among rotation speed of the spindle motor, a distance of the head with respect to the center of the disk and vibration magnitude of the disk, thereby obtaining an analyzed result; and determining said specific distance of the head with respect to the center of the disk based on said analyzed result.

11. The method according to claim 8, wherein said low speed of the spindle motor is 50 to 70 rps (rotations per second).

12. The method according to claim 8, wherein said high speed of the spindle motor is 180 to 240 rps (rotations per second).

13. The method according to claim 8, wherein said specific distance of the head with respect to the center of the disk ranges 22 to 58 mm.

14. The method according to claim 8, wherein said average vibration magnitude is an average of the vibration magnitude of said spindle motor during raising the rotating speed of the spindle motor from said low speed to said high speed.

* * * * *